United States Patent
Cho et al.

(10) Patent No.: US 6,965,341 B1
(45) Date of Patent: Nov. 15, 2005

(54) HIGH RESOLUTION SAR PROCESSING USING STEPPED-FREQUENCY CHIRP WAVEFORM

(75) Inventors: Kwang Myung Cho, Rancho Palos Verdes, CA (US); Leo H. Hui, Alhambra, CA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 48 days.

(21) Appl. No.: 10/734,956

(22) Filed: Dec. 15, 2003

(51) Int. Cl.[7] .................. G01S 13/90; G01S 13/38
(52) U.S. Cl. .............. 342/25 A; 342/25 R; 342/25 F; 342/128; 342/129; 342/130; 342/131; 342/132; 342/175; 342/195; 342/200; 342/201; 342/202; 342/205
(58) Field of Search ................ 342/25 R–25 F, 342/82–103, 118, 128–146, 175, 176, 179, 342/190–197, 201–205

(56) References Cited

U.S. PATENT DOCUMENTS

| | | | |
|---|---|---|---|
| 3,969,725 A * | 7/1976 | Couvillon et al. | 342/132 |
| 4,096,478 A * | 6/1978 | Chavez | 342/132 |
| 5,394,151 A * | 2/1995 | Knaell et al. | 342/25 R |
| 5,424,742 A * | 6/1995 | Long et al. | 342/25 R |
| 5,428,361 A * | 6/1995 | Hightower et al. | 342/132 |
| 5,430,445 A * | 7/1995 | Peregrim et al. | 342/25 R |
| 5,731,784 A * | 3/1998 | Barron et al. | 342/204 |
| 5,815,111 A * | 9/1998 | Gouenard et al. | 342/25 R |
| 6,750,809 B1 * | 6/2004 | Cho et al. | 342/129 |

OTHER PUBLICATIONS

P. Bourke, "Discrete Stepped Frequency Modulated Chirp"; posted on the Internet at astronomy.swin.edu.au; dated Dec. 1984.*

H. Schimpf et al., "High range resolution by means of synthetic bandwidth generated by frequency-stepped chirps"; "Electronics Letters," vol. 39, No. 18; Sep. 4, 2003.*

"Four Practical Applications of Joint Time-Frequency Analysis"; no author given; no date given; posted on the Internet at zone.ni.com; copyright year is 2005.*

* cited by examiner

*Primary Examiner*—Bernarr E. Gregory
(74) *Attorney, Agent, or Firm*—William G. Auton

(57) ABSTRACT

A stepped-frequency chirped waveform improves SAR groundmapping for the following reasons. Range resolution in SAR image is inversely proportional to the transmitted signal bandwidth in nominal SAR systems. Since there is a limit in the transmitted bandwidth that can be supported by the radar hardware, there is a limit in range resolution that can be achieved by processing SAR data in conventional manner. However, if the frequency band of the transmitted signal is skipped within a group of sub-pulses and received signal is properly combined, the composite signal has effectively increased bandwidth and hence improvement in range resolution can be achieved. The proposed new and practical approach can effectively extend the limit in range resolution beyond the level that is set by the radar hardware units when conventional method is used.

3 Claims, 4 Drawing Sheets

Range sample combining block in the SAR signal processing chain

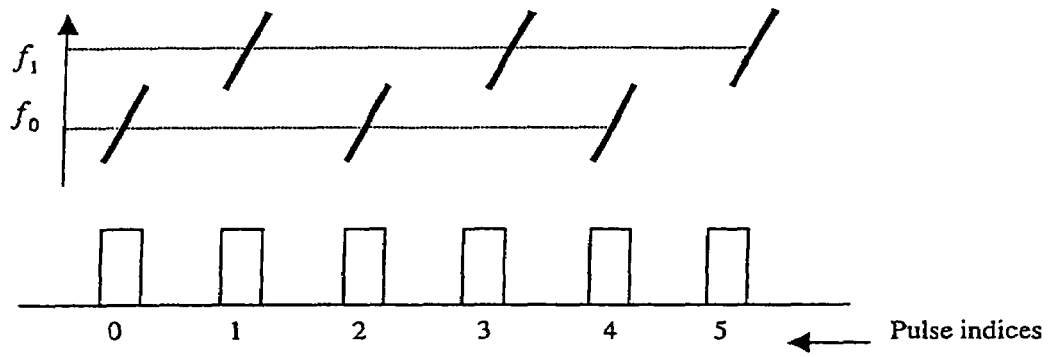
Fig. 1 Transmitted pulses with instantaneous frequencies of two steps for increased bandwidth. Sub-pulse pair: (0,1), (2,3), (4,5), ...
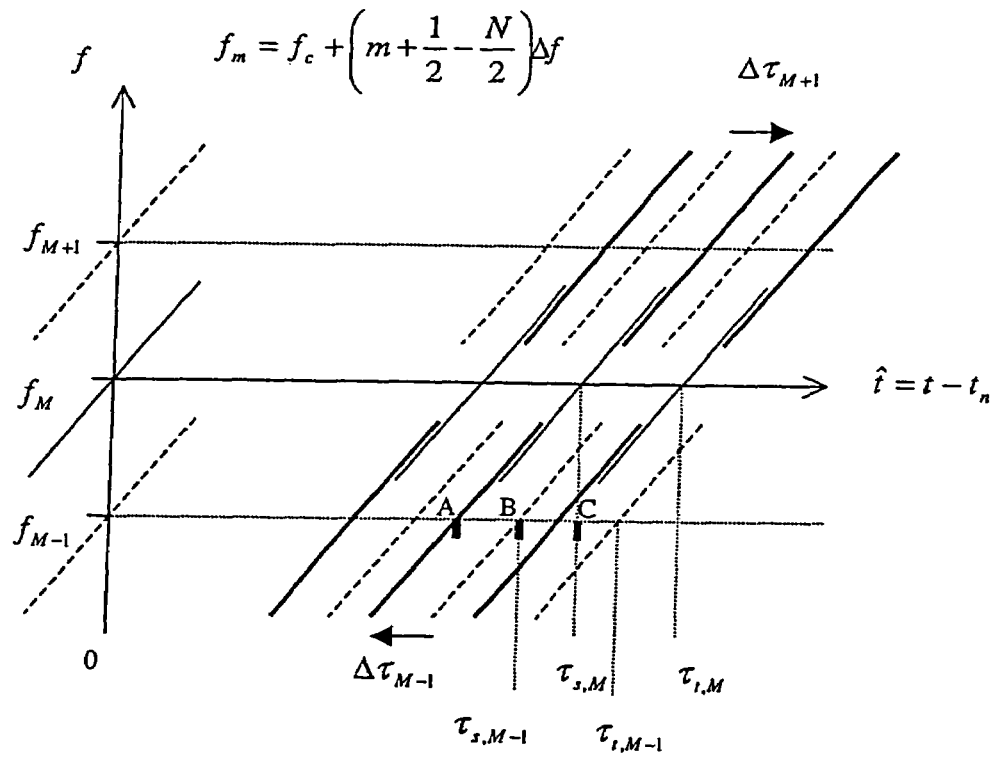
Fig. 2 Frequencies of the returned signals in three steps

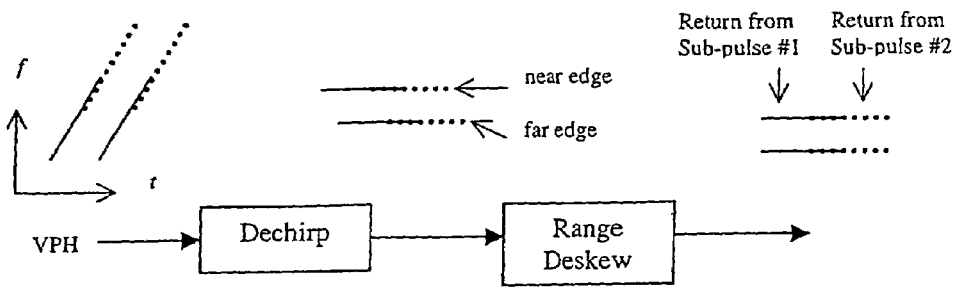
Fig. 3 Signals from two sub-pulses with proper phase adjustments and time shift
Fig. 4 Range sample combining block in the SAR signal processing chain
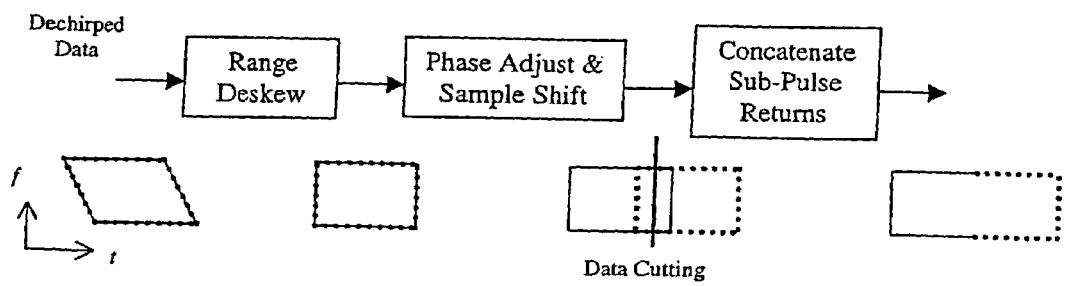
Fig. 5 Data combining sequence for configuration A

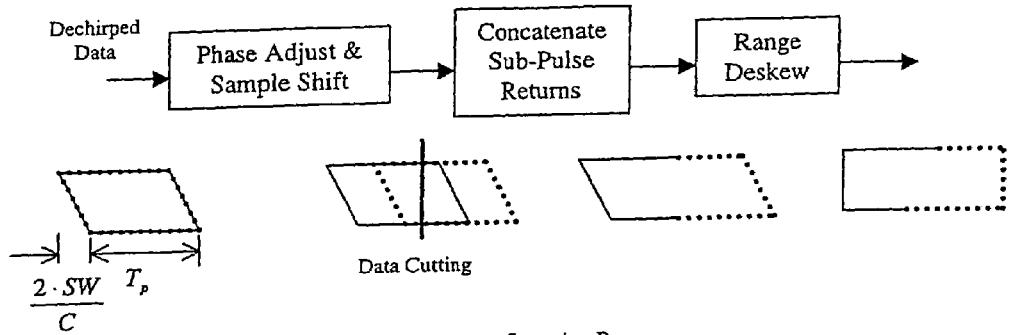
Fig. 6 Data combining sequence for configuration B
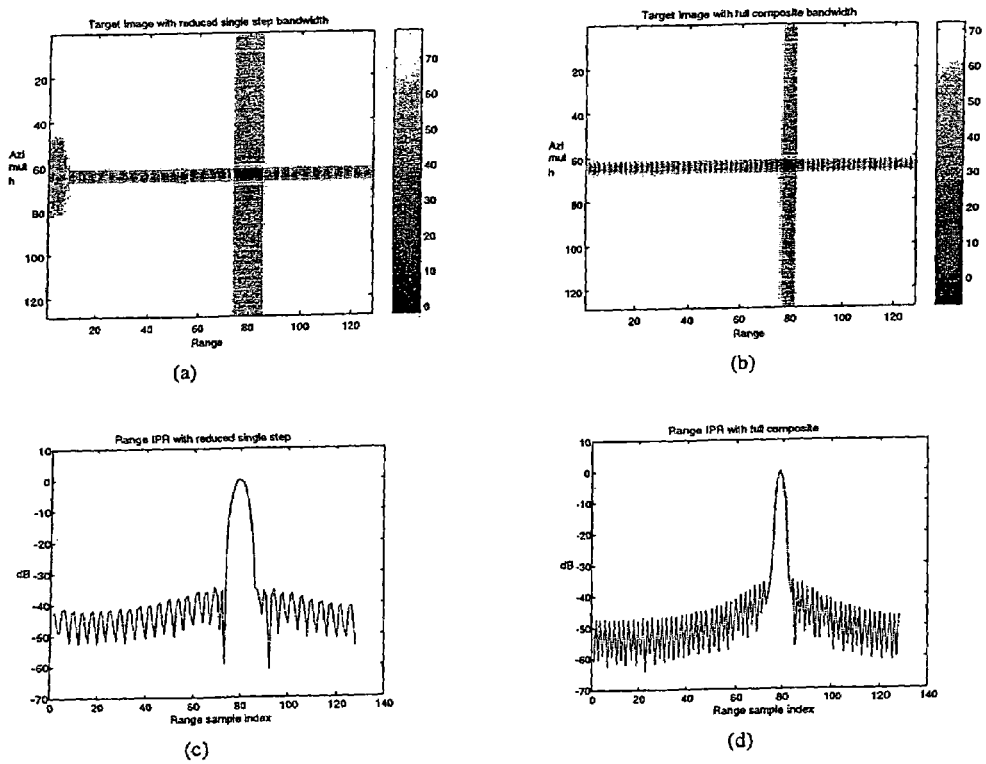
Fig. 7 Formed image and range IPR plots with reduced single step bandwidth (a,c) and full composite bandwidth (b,d)

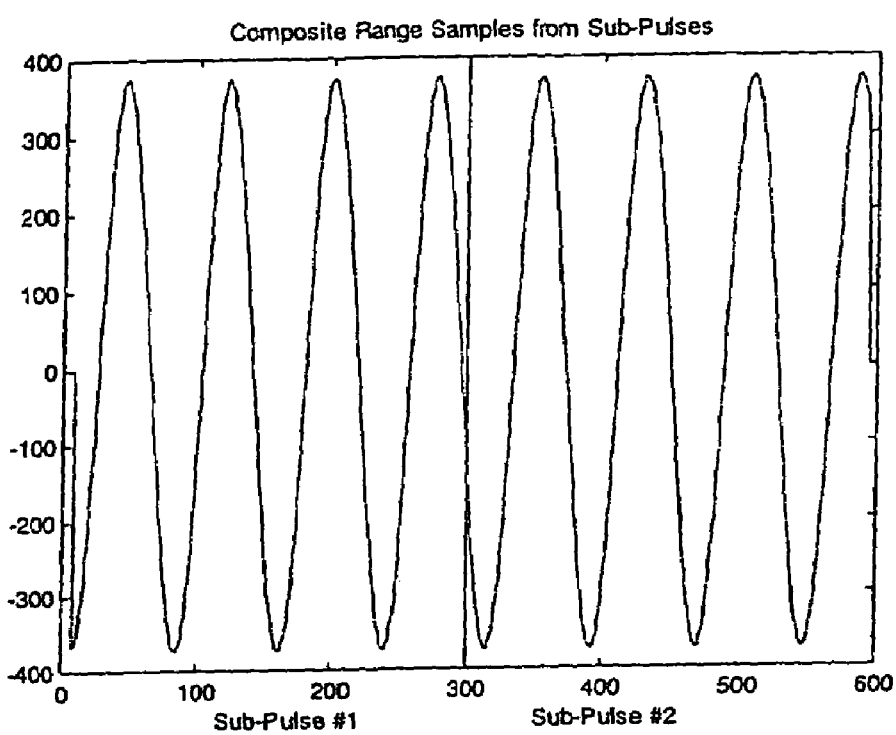
Fig. 8 Composite range samples by cutting and concatenating dechirped range samples from two sub-pulse returns

HIGH RESOLUTION SAR PROCESSING USING STEPPED-FREQUENCY CHIRP WAVEFORM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar systems and more specifically to a waveform process for use with radar systems.

A Synthetic Aperture Radar (SAR) system is used for ground mapping even in poor weather conditions in which optical sensor cannot be used. Mapping range of SAR is generally longer than optical sensor and it can also be operated during night. Using SAR, desired resolution in azimuth is achieved by maintaining phase coherence between pulses and combining them in proper manner. The length of collected data (array length) is determined by desired azimuth resolution and collection geometry.

The following references disclose recent SAR systems that can be used with the present invention and the disclosures of which are incorporated herein by reference:

U.S. Pat. No. 6,492,932, SYSTEM AND METHOD FOR PROCESSING SQUINT MAPPED SYNTHETIC APERTURE RADAR DATA, invented by Jin, Michael U.S. Pat. No. 6,255,981, METHOD FOR RANGE ALLIGNMENT AND ROTATION CORRECTION OF A HIGH RESOLUTION IMAGE IN AN INVERSE SYNTHETIC APERTURE RADAR SYSTEM, invented by Samaniego, Raymond U.S. Pat. No. 5,430,445, SYNTHETIC APERTURE RADAR GUIDANCE SYSTEM AND METHOD OF OPERATING SAME, Peregrim, and U.S. Pat. No. 5,424,742, SYNTHETIC APERTURE RADAR GUIDANCE SYSTEM AND METHOD OF OPERATING SAME, Long, Albert H.

The above-cited references all describe SAR systems developed by Raytheon and which can use the present invention. The best reference is U.S. Pat. No. 5,430,445, SYNTHETIC APERTURE RADAR GUIDANCE SYSTEM AND METHOD OF OPERATING SAME, Peregrim, and this system uses a chirped signal provided by a chirp generator, and its performance can be improved, as discussed below.

SUMMARY OF THE INVENTION

The present invention is a waveform process for use with SAR groundmapping radar systems, and is based upon the following observations.

Range resolution in SAR image is inversely proportional to the transmitted signal bandwidth in nominal SAR systems. Since there is a limit in the transmitted bandwidth that can be supported by the radar hardware, there is a limit in range resolution that can be achieved by processing SAR data in conventional manner. However, if the frequency band of the transmitted signal is skipped within a group of sub-pulses and received signal is properly combined, the composite signal has effectively increased the bandwidth and hence improvement in range resolution can be achieved. The proposed new and practical approach can effectively extend the limit in range resolution beyond the level that is set by the radar hardware units when conventional method is used.

Several people proposed some step-frequency schemes for high resolution SAR in the past. They all tried to combine data before dechirp processing and it is not considered to be practical for general high resolution SAR systems since dechirp function for high resolution mode is performed before A/D conversion. The new method proposes range samples from sub-pulses to be combined after dechirp and A/D function and therefore it is easy to implement.

Based on a clear understanding of signal relationship between sub-band steps it was necessary to derive the condition to connect returned signals from sub-pulses without discontinuity around the sub-pulse boundaries. To maintain the phase coherence it was found that the proper phase adjustment and time shift were required. The idea was proved valid through test by implementing it to the SAR simulation program. Final image and intermediate results conformed to the prediction.

This invention claims that the followings are new.
1. The idea of combining sub-pulse range samples after the dechirp function
2. Derived requirements of phase adjustment and time shift to maintain continuity between sub-pulse data
3. Two alternative embodiments based on functional sequence for data composition and any version that are alternative but equivalent implementations
4. Data cutting and concatenating to minimize the error effect around the step boundaries
5. SAR groundmapping by transmitting stepped frequency chirp pulse waveforms with pulse pairs where the second chirped pulse has a higher frequency than the first chirped pulse.

DESCRIPTION OF THE DRAWINGS

FIG. 1 is a chart of transmitted pulses with instantaneous frequencies of two steps for increased bandwidth. Sub-pulse pair: (0, 1), (2,3), (4,5), . . . ;

FIG. 2 is a chart of the frequencies of the returned signals in 3 steps;

FIG. 3 is a chart of signals from two subpulses with proper phase adjustments and time shift;

FIG. 4 is a block diagram of a range sample combining block in the SAR signal processing chain;

FIG. 5 is a chart of the data combining sequence of configuration A;

FIG. 6 is a chart of the data combining sequence of configuration B;

FIGS. 7a–7d are charts of the formed image and range IPR plots with reduced single step bandwidth (a,c) and full composite bandwidth (b,d); and FIG. 8 is a chart of composite range samples by cutting and concatenating dechirped range signals from two subpulse returns.

DETAILED DESCRIPTION OF THE PREFERRED EMBODIMENT

The present invention includes process for use with SAR, systems that uses a stepped-frequency chirp waveform during groundmapping.

Range resolution in SAR images is determined by the radar bandwidth: range resolution is inversely proportional to the radar bandwidth. Therefore, for very high resolution in range, radar bandwidth of the SAR system is required to be very large. To meet the requirement of desired minimum average power with limited peak power, stretched pulse with linear frequency modulation (LFM) is widely used in SAR systems. As the radar bandwidth increases, hardware performance degrades and there is a limit on bandwidth that radar hardware such as antenna and receiver can support. Natural approach under this situation where very high range resolution requirement cannot be met due to hardware limitation is to transmit sub-pulses that have varying center frequencies with limited bandwidth and combine the return for each sub-pulse so that increased bandwidth is effectively achieved. This technique of transmitting sub-pulses with varying center frequencies and combining returned signals from sub-pulses to achieve effectively increased bandwidth is called stepped frequency or step stretch method. FIG. 1 shows the transmitted pulses with two frequency steps to achieve wider bandwidth by combining returned signal from two sub-pulses.

There were ideas proposed in the past on stepped frequency technique by combined chirping signal. Unlike the past work, the proposed method shows how to combine returned data from each sub-pulse after dechirp processing. It is considered to be practical and useful sine most high-resolution SAR systems perform range dechirp processing before analog-to-digital (A/D) conversion and dechirped digital data is available at a rate that can readily be handled. Following discussions will provide detailed expressions to combine sub-pulse returns and other relevant techniques.

To combine returned signals from sub-pulses with different center frequencies, it is important to understand the relationship between dechirped signal from each sub-pulse. Comparing the dechirped signal expressions from each pulse will lead to the adjustments that are required when sub-pulse returns are combined. Chirp slope $\gamma$ and pulse index n will be used in the signal expressions. Also, for generalized derivation with multiple frequency steps, step index m within each sub-pulse group will be used. Time delay to a target and reference point at step m will be denoted by $\tau_{t,m}$ and $\tau_{s,m}$, respectively. Phase for transmitted and received signals and reference signal for LFM can be expressed as follows.

$$\text{Transmit } \Phi_m^T(t, n) = f_m t + \frac{\gamma}{2}(t - t_n)^2$$

$$\text{Receive: } \Phi_m^R(t, n) = f_m(t - \tau_{t,m}) + \frac{\gamma}{2}(t - t_n - \tau_{t,m})^2$$

$$\text{Reference: } \Phi_m^{REF}(t, n) = f_m t + \frac{\gamma}{2}(t - t_n - \tau_{s,m})^2$$

Dechirp processing mixes the received signal with the reference signal to provide phase expression as $$\Phi_m(t, n) = -\Phi_m^R + \Phi_m^{REF} \quad (1)$$

$$= f_m \tau_{s,m} + [f_m + \gamma(\hat{t} - \tau_{s,m})](\tau_{t,m} - \tau_{s,m}) -$$

$$\frac{\gamma}{2}(\tau_{t,m} - \tau_{s,m})^2$$

where new time variable $\hat{t} = t - t_n$.

Let's consider a sub-pulse group that includes pulses with index m and m-i. It is generally true that $$\tau_{s,m} \neq \tau_{s,m-i}, \tau_{t,m} \neq \tau_{t,m-i}$$

However, it is important to note that difference between the time delay to a target and the time delay to the reference point stays about the same in two sub-pulses. That is:

$$\tau_{t,m-i} - \tau_{s,m-1} \approx \sigma_{t,m} - \tau_{s,m}$$

With this good approximation on time delay difference within the same sub-pulse group, we can rewrite (1) for reference step M and any other step m within the same sub-pulse group with the substitution of $\Delta \tau = \tau_{t,m} - \tau_{s,m}$ as follows.

$$\Phi_M(\hat{t}) = f_M \tau_{s,m}[f_M + \gamma(\hat{t} - \tau_{s,M})]\Delta \tau_t - \frac{\gamma}{2}\Delta \tau_t^2$$

$$\Phi_m(\hat{t}) = f_m \tau_{s,m}[f_m + \gamma(\hat{t} - \tau_{s,m})]\Delta \tau_t' - \frac{\gamma}{2}\Delta \tau_t^2$$

To get a composite signal without discontinuity from sub-pulse returns it is required to maintain phase coherence. This means that the phase expressed in the above expressions should be equal between step M and m for all values of time variables $\hat{t}$. By comparing phase terms that are independent of targets, required phase correction to the signal at step m is obtained as $$\Delta \Phi_m = f_M \tau_{s,M} - f_m \tau_{s,m} \quad (2)$$

To obtain the time delay adjustment at step m, we introduce required time shifting variable $\Delta \tau_m$ and set the multiplying terms to $\Delta \tau_t$ in two expressions to be equal as $$f_M + \gamma(\hat{t} - \Delta \tau_m - \tau_{s,m})$$

$\Delta \tau_m$ is then obtained as $$\Delta \tau_m = \tau_{s,M} - \tau_{s,m} - (f_M - f_m)/\gamma \quad (3)$$

Using the above expressions, phase record at step m can be adjusted for phase coherence to the reference phase record at step M through time shifting and phase adjusting as follows.

$$\hat{\Phi}_m(\hat{t}) = \Phi_m(\hat{t} - \Delta \tau_m) + \Delta \Phi_m$$

Derived time shifting that is required to maintain phase continuity at step m can be validated by observing the relationship between neighboring steps illustrated in FIG. 2. Depicted in the figure are the frequencies of transmitted signals at three steps and their returns. Two groups of dotted lines indicate returned signals at two sub-pulses around the central one that is assumed to be the reference step. To maintain phase continuity, adjustments should be performed so that linear frequency profiles from all steps are connected. To find the required adjustments at step M-1 to make it aligned to step M, we use three points A, B, and C as marked in the figure. A and B, respectively, are the time delays to the reference point before and after adjustments at step M-1, and C is the time delay to the reference point at step M. It can be noted that time delays for points B and C are $\tau_{s,M-1}$ and $\tau_{s,M}$, respectively. Then, the required time shift is $\overline{BA}$ and it can be obtained as follows.

$$\Delta \tau_{M-1} = \overline{BA} = \overline{CA} - \overline{CB}$$

$$= -(f_M - f_{M-1})/\gamma + \tau_{s,M} - \tau_{s,M-1}$$

This expression is identical to (3) with m=M−1.

The paragraphs above described requirements on phase and time shifts adjustments when received signals from sub-pulses that have different center frequencies need to be combined for the improvement of range resolution. In implementing the derived condition it is important to determine how we handle the data around the edges of each band. Because of the inaccuracies around band edges and in the transition band it is difficult to get good results by blending neighborhood sub-pulse data. A more desirable approach is cutting out data at the mid-point between neighboring sub-pulse returns and concatenating them. Another issue is to determine at what stage in the processing chain the sub-pulse returns should be combined.

Let's consider the returned signals from two sub-pulses after proper phase and time shift adjustments as explained in the previous section. FIG. 3 illustrates time history of signals returned from near and far range edges of a swath through dechirp and range deskew processing that are normally required for high-resolution SAR systems with single-step frequency band. As observed in the figure, length of the composite signal from sub-pulses is increased and this leads to the improvement in range resolution. Since sub-pulse data are combined, the resulting PRF is reduced by a factor that is equal to the number of sub-pulses. The final effective PRF has a lower limit that needs to avoid the Doppler ambiguity. The lower limit requirement on PRF to avoid the Doppler ambiguity sets the upper limit for the time interval between sub-pulses. If the time interval is too small, target signal can significantly be corrupted by the target returns at different ranges from other neighboring sub-pulses. This effect due to increased PRF that is called the range ambiguity should also be avoided. To limit the range ambiguity effect it is desirable to maintain a small as possible overlap between each sub-pulse step. However, considering the uncertainties on band edges and effect of transition band, spectrum overlap should be allowed up to a certain level. Also, in some cases as discussed for the second configuration that will be presented, some overlap is required.

The next question is how the data in the overlapped portion are combined. Without accurate characterization of pass band and transition, blending data in the overlapped portion leads to an unacceptable level of error around the boundary between sub-pulses. It is believed that the best way of combining sub-pulse data is cutting the data in the middle of the overlapped region and connecting them since slight sample shift has less impact than phase or magnitude error on the performance. This cutting and concatenating technique will be used for two configurations described in this section.

Required bandwidth and center frequency for each step will be calculated. Denote the band overlap normalized by single step bandwidth by $O_v$. Then, the required full bandwidth BW and single step bandwidth $BW_1$ can be calculated as follows for the desired resolution $\delta$, number of steps $N_{step}$, mainlobe-broadening factor k, overlap $O_v$, and speed of light C.

$$BW = \frac{k \cdot C}{2\delta} \quad (4)$$

$$BW_1 = \frac{BW}{N_{step}(1 - O_v) + O_v}$$

Center frequency at step m, for m=1,2, ..., $N_{step}$, is calculated by $$f_{cl}(m) = f_c - \frac{BW}{2} + BW_1\left[(m-1)(1 - O_v) + \frac{1}{2}\right] \quad (5)$$

for the center frequency of the composite waveform, $f_c$.

Two configurations proposed in the following for the implementation of combining dechirped return signals from multiple sub-pulses correspond to the common block marked by 'Step Stretch Configuration' in FIG. 4.

Return signals from sub-pulses can be combined after range-deskew processing as shown in FIG. 5. The advantage of this approach is minimized spectrum overlap since range samples returned from all sub-pulses are aligned. As mentioned, reduced spectrum overlap results in reduced range ambiguity. A drawback of this method is increased ripples around the sub-pulse boundaries caused by the range deskew function. Ripples may be able to be compensated up to a certain level using the predicted ripple output that can be calculated with ideal signal pattern. Discrepancy between the real and the actual signal shapes can result in ripples of unacceptable level.

Required time shift to maintain continuity was derived above. Since the calculated time shift is not an integer in general, nearest integer value can be used to align range samples. Fractional shift can be implemented by applying linear phase after taking FFT. However, realization of fractional time shift this way can cause signal distortion as confirmed by simulation and therefore, is not recommended. Since absence of fractional timing shift has insignificant effect compared to the phase or magnitude error, in particular for targets near map center, just taking the nearest integer for the required time shift will lead to acceptable performance.

An alternative approach for combining range samples from multiple sub-pulses is to perform data combining function before range deskew as shown in FIG. 6. With this functional sequence, there are no large ripples that occur around the sub-pulse boundaries with the configuration A since range deskew is performed after the sub-pulse returns are combined. A drawback of this approach is the increased overlap between sub-pulses to insure no data gap caused by cutting data in each pulse return. Since time delay corresponding to swath width is generally small compared with the pulse width in most high resolution SAR systems, required overlap bandwidth is generally small compared with the radar bandwidth. As observed from the data shape in FIG. 6, required minimum overlap between sub-pulses is determined by swath width. For swath width SW and pulse width $T_p$ minimum overlap normalized by the pulse width is calculated as $$O_v = \frac{2 \cdot SW}{C \cdot T_p}$$

Overlap bandwidth is then computed by $$BW_{over} = \frac{2 \cdot SW}{C \cdot T_p} \cdot BW_1$$

where $BW_1$ is the bandwidth of the single step expressed in (4).

SIMULATION RESULTS

Test target signal could be generated and processed using a simulation program. Using a single step with reduced bandwidth, formed image shows degraded range resolution in FIG. 7(a). Combining two sub-pulse returns using two-step radar frequency bands, range resolution of target image is improved as shown in FIG. 7(b). Impulse response in range in each case is plotted in FIGS. 7(c) and 7(d), respectively. Since the target image is displaced in range from map center, dechirped signal should be sinusoidal with non-zero frequency. The real part of the composite signal based on configuration B is illustrated in FIG. 8. Plot of the composite signal shows smooth connection between returns from two sub-pulses.

The present invention uses the terrain classification systems previously developed by Raytheon, as described in the Peregrim patent, for ground mapping. As discussed therein, the feature classification process includes, in more detail, the operator classifying the features according to the typical feature types described in Table 1.

TABLE 1

| NATURAL | MAN-MADE STRUCTURES |
|---|---|
| Concrete | Simple Roof Building |
| Asphalt | Complex Face Structure |
| Grass | Complex Roof Structure |
| Trees | Complex Structure |
| Dirt/Gravel | Bridge |
| Water | Complex Volume |

The latter is done by selecting a feature type from Table 1. and placing the cursor inside each of the homogenous regions thus labeling each pixel in the homogenous region as such as feature. Natural features are classified based on texture, gray level and context. Man-made structures are identified from shadows and line of sight geometry and are classified based on texture and context. Man-made structures are classified as follows.

If a top of a structure has a feature which is smooth, it is classified as a simple roof building. Typically, the leading edge dihedral established by the vertical surface of the building and the ground provides the radar reflectivity. The radar cross section (RCS) of the top of the building, the trailing edge of the building and the ground is lower than the leading edge dihedral. Aircraft hangers and POL tanks with smooth tops also exhibit such radar reflectivity.

A complex face structure has a feature that has reflectivity along the entire side of the structure. An example of this type is a building having windows along the entire vertical face. In order to identify and classify a building as a complex face structure, it is necessary to have oblique photography.

If the top of a structure is rough in texture due to, for example, air conditioning and plumbing equipment fixtures, it is classified as a complex roof building. The entire roof will exhibit a high RCS due to scattering effects from the fixtures. Power plants exhibit such radar reflectivity.

A feature is a complex structure when the feature exhibits reflectivity over the entire surface of the structure. This can be represented by a combination of a complex roof and a complex face structure. Refineries and metal pipelines typically have features with these characteristics.

A feature is classified as a bridge if it is a slab bridge or a road bridge. In general, this category includes all bridge types except for truss bridges which exhibit a higher radar cross section.

Complex volume is a structure with features that exhibit reflectivity over the entire volume of the structure. Examples of this type of structure include truss bridges, transformer yards and substations.

Each pixel in each like region is coded to identify the feature type (i.e. here codes are used which corresponds to the features of Table 1.). At a boundary, the code of each pixel on each side of the boundary indicates the type of feature pair (i.e. a code pair indicates a grass/water feature pair).

Once the operator has classified the features of the structures within the template, these regions are specially coded with respect to their class types.

What is claimed is:

1. A method for groundmapping with a Synthetic Aperture Radar system comprising the steps of:
   transmitting a series of stepped frequency chirped pulse pairs toward a target of interest to generate target echo return signals in a data system;
   dechirping the target echo return signals in the data stream to produce pairs of sub-pulse range samples;
   combining pairs of sub-pulse range samples to produce a synthetic wide-band equivalent data stream; and
   performing terrain mapping on the wide-band equivalent data stream.

2. A method for groundmapping, as defined in claim 1, wherein said transmitting step comprises transmitting a series of first and second chirped pulse pairs wherein said second chirped pulse in the pair always has a higher frequency than the first chirped pulse in the pair.

3. A method, as defined in claim 2, wherein said transmitting step comprises transmitting a chirped pulse using $$\Phi_m^T(t, m) = f_m t + \frac{\gamma}{2}(t - t_n)^2,$$

and wherein said dechirping step comprises processing $$\Phi_m^R(t, n) = f_m(t - \tau_{t,m}) + \frac{\gamma}{2}(t - t_n - \tau_{t,m})^2$$

on a received signal by dechirp processing which mixes the received signal with a reference signal composed of:

$$\Phi_m^{REF}(t, n) = f_m t + \frac{\gamma}{2}(t - t_n - \tau_{s,m})^{2^2}$$

where $\gamma$ equals a chip slope, n equals a pulse index, and reference point at step m will be denoted by $\tau_{t,m}$ and $\tau_{s,m}$ where new time variable $\hat{t}=t-t_n$.

* * * * *